US009467757B2

(12) United States Patent
Takahashi et al.

(10) Patent No.: US 9,467,757 B2
(45) Date of Patent: Oct. 11, 2016

(54) WAVELENGTH SELECTIVE SWITCH

(71) Applicant: Sumitomo Electric Industries, Ltd., Osaka-shi (JP)

(72) Inventors: Kenichiro Takahashi, Yokohama (JP); Hidehisa Tazawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/729,576

(22) Filed: Jun. 3, 2015

(65) Prior Publication Data

US 2015/0358698 A1 Dec. 10, 2015

(30) Foreign Application Priority Data

Jun. 4, 2014 (JP) ................................ 2014-115885

(51) Int. Cl.
*H04J 14/06* (2006.01)
*G02B 6/00* (2006.01)
*H04Q 11/00* (2006.01)
*H04J 14/02* (2006.01)

(52) U.S. Cl.
CPC ............ *H04Q 11/0005* (2013.01); *G02B 6/00* (2013.01); *H04J 14/0212* (2013.01); *H04J 14/06* (2013.01); *H04Q 2011/0016* (2013.01); *H04Q 2011/0035* (2013.01)

(58) Field of Classification Search
USPC ..................................................... 398/46, 48
See application file for complete search history.

(56) References Cited

U.S. PATENT DOCUMENTS

| | | | |
|---|---|---|---|
| 3,951,881 A | 4/1976 | Molina | |
| 6,801,310 B2 * | 10/2004 | Kewitsch | G02B 6/2713 356/328 |
| 7,397,980 B2 | 7/2008 | Frisken | |
| 7,787,720 B2 | 8/2010 | Frisken et al. | |
| 8,611,742 B2 | 12/2013 | Yang et al. | |
| 2003/0095305 A1 * | 5/2003 | Kewitsch | G02B 6/2713 398/41 |
| 2006/0239607 A1 * | 10/2006 | Yamamoto | G02B 6/2713 385/16 |
| 2010/0208262 A1 * | 8/2010 | Yoshida | G01J 3/02 356/328 |
| 2013/0272650 A1 * | 10/2013 | Ishikawa | G02B 6/35 385/17 |

FOREIGN PATENT DOCUMENTS

| | | |
|---|---|---|
| JP | 2011-248000 A | 12/2011 |
| JP | 2012-181497 A | 9/2012 |
| JP | 2014-067004 A | 4/2014 |
| WO | WO-2008/057347 A2 | 5/2008 |
| WO | WO-2014/034144 A1 | 3/2014 |

* cited by examiner

*Primary Examiner* — David Payne
*Assistant Examiner* — Omar S Ismail
(74) *Attorney, Agent, or Firm* — Venable LLP; Michael A. Sartori; Tamatane J. Aga

(57) ABSTRACT

A wavelength selective switch includes an input/output unit that has a first port group including a first input port and a first output port and a second port group including a second input port and a second output port; a wavelength dispersion element that disperses wavelength multiplexing light in wavelength components; a deflection element that deflects a direction of an incident beam; and an optical system that optically couples the input/output unit, the wavelength dispersion element, and the deflection element along a predetermined axis. The optical system includes an optical component, a first input beam input from the first input port is inclined at a first angle to the predetermined axis and is incident on the optical component, and a second input beam input from the second input port is inclined at a second angle to the predetermined axis and is incident on the optical component.

11 Claims, 4 Drawing Sheets

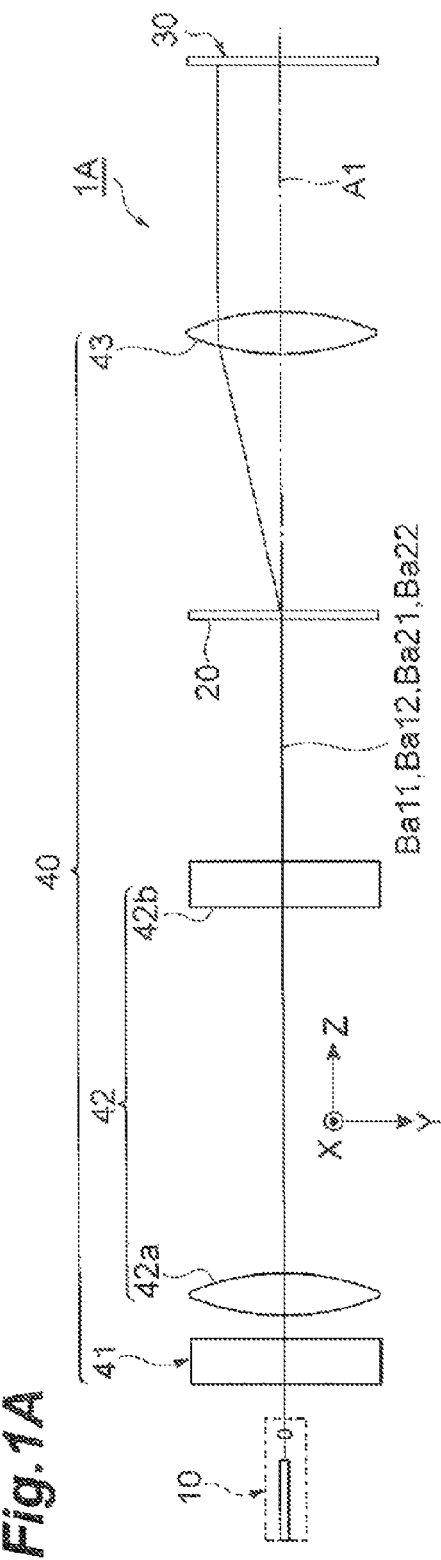
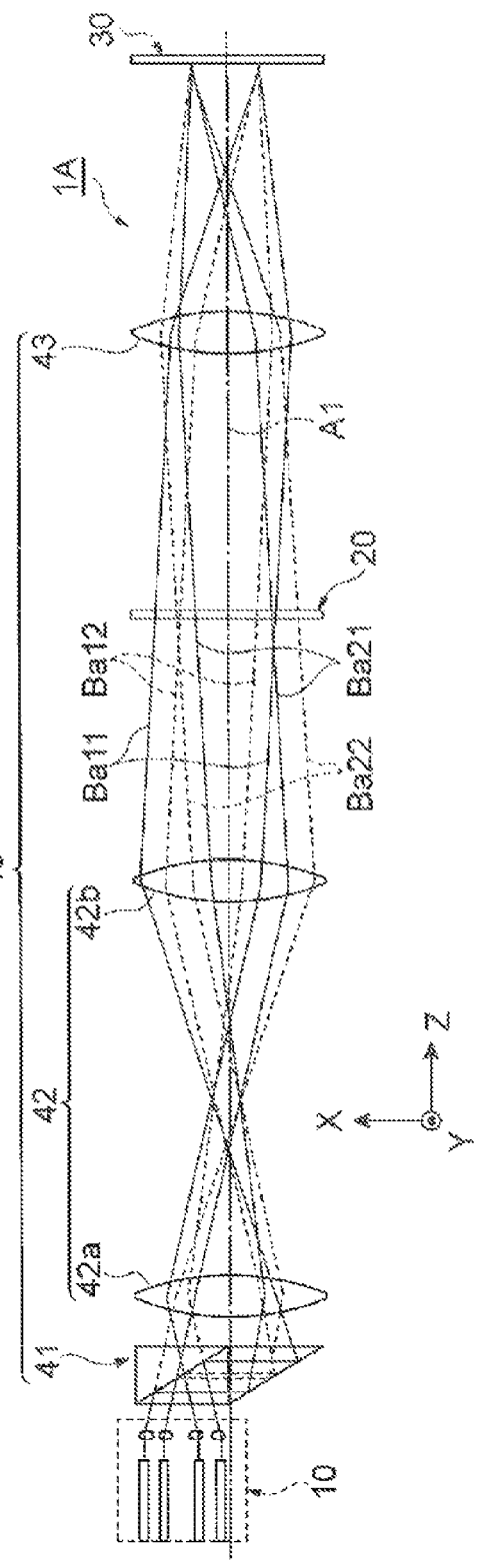

WAVELENGTH SELECTIVE SWITCH

BACKGROUND OF THE INVENTION

1. Field of the Invention

The present invention relates to a wavelength selective switch.

2. Related Background Art

A wavelength selective switch is disclosed in U.S. Pat. No. 7,397,980 and Japanese Patent Application Laid-Open No. 2011-248000. The wavelength selective switch includes a plurality of port groups that include input ports and output ports. A beam input from the input port of each port group is deflected independently in an individual deflection area.

A wavelength selective switch in which an optical axis of a beam input from a certain port group and an optical axis of a beam input from other port group are inclined in directions opposite to each other for a predetermined axis is known. For example, when an optical element included in an optical system has a refractive index boundary surface vertical to the predetermined axis, the beam input from the input port of the certain port group may return to an input port of a different port group.

SUMMARY

A wavelength selective switch according to one aspect of the present invention includes: an input/output unit having a first port group including a first input port and a first output port and a second port group including a second input port and a second output port; a wavelength dispersion element dispersing wavelength multiplexing light in wavelength components; a deflection element deflecting a direction of an incident beam; and an optical system optically coupling the input/output unit, the wavelength dispersion element, and the deflection element along a predetermined axis, wherein the optical system includes an optical component, a first input beam input from the first input port is inclined, at a first angle to the predetermined axis and is incident on the optical component, a second input beam input from the second input port is inclined at a second angle to the predetermined axis and is incident on the optical component, positive/negative signs of inclinations of the first angle and the second angle for the predetermined axis are different from each other, art optical axis of the optical component is inclined to the predetermined axis, such that a part of the first input beam is inclined at a third angle to the predetermined axis in the optical component and is reflected and a part of the second input beam is inclined at a fourth angle to the predetermined axis in the optical component and is reflected, the third angle is different from the first angle and the second angle, the fourth angle is different from the first angle and the second angle, and positive/negative signs of inclinations of the third angle and the fourth angle for the predetermined axis are equal to each other.

BRIEF DESCRIPTION OF THE DRAWINGS

FIG. 1A is a schematic diagram illustrating a configuration of a wavelength selective switch according to an embodiment and a diagram illustrating the wavelength selective switch when viewed from an upper side;

FIG. 1B is a schematic diagram illustrating a configuration of the wavelength selective switch according to the embodiment and diagram illustrating the wavelength selective switch when viewed from a lateral side;

DESCRIPTION OF THE EMBODIMENTS

Figure 2A:
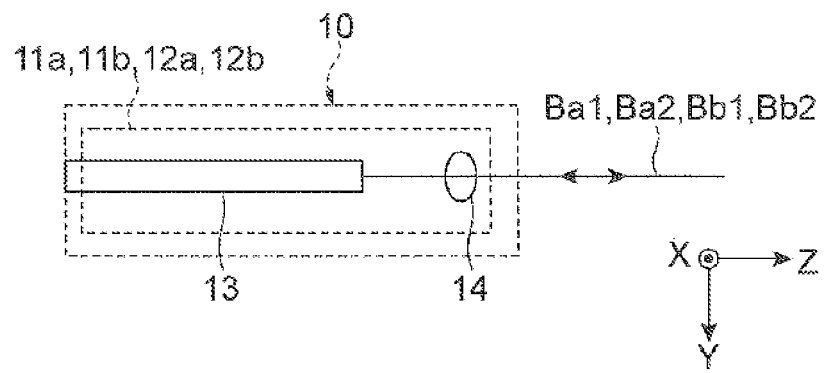
FIG. 2A is an enlarged view of a configuration of an input/output unit and a diagram illustrating the input/output unit when viewed from an upper side (X-axis direction)

Hereinafter, a specific example of a wavelength selective switch according to an embodiment of the present invention will be described with reference to the drawings. The present invention is not limited to the exemplary embodiment but indicated by claims and all changes in a meaning and a range equivalent to the claims are included in the present invention. In the following description of the drawings, like elements are denoted by like reference numerals and overlapped description is omitted.

FIGS. 1A and 1B are schematic diagrams illustrating a configuration of a wavelength selective switch 1A according to the embodiment of the present invention. FIG. 1A is a diagram illustrating the wavelength selective switch 1A when viewed from an upper side and FIG. 1B is a diagram illustrating the wavelength selective switch 1A when viewed from a lateral side. In order to facilitate understanding, an XYZ orthogonal coordinate system is illustrated in FIGS. 1A and 1B. An X axis defines a vertical direction, a Y axis defines a horizontal direction, and a Z axis defines an anteroposterior direction.

As illustrated in FIGS. 1A and 1B, the wavelength selective switch 1A according to this embodiment includes an input/output unit 10, a wavelength dispersion element 20, a deflection element 30, and an optical system 40. In addition, the optical system 40 has an optical component 41, a relay optical system. 42, and a condensing lens 43. The input/output unit 10 and the wavelength dispersion element 20 are optically coupled along a predetermined axis A1, by the optical component 41 and the relay optical system 42. In addition, the wavelength dispersion element 20 and the deflection element 30 are optically coupled along the predetermined axis A1, by the condensing lens 43. For simplification of description, the predetermined axis A1 is shown by a straight line in the drawings. However, the predetermined axis A1 may be bent by a reflection mirror or a prism. In this embodiment, the predetermined axis A1 is matched with the Z axis.

Hereinafter, a side of the input/output unit 10 on an optical path between the input/output unit 10 and the deflection element 30 is called a front step (or a front side). In addition, a side of the deflection element 30 on the same optical path is called a rear step (or a rear side).

Figure 2B:
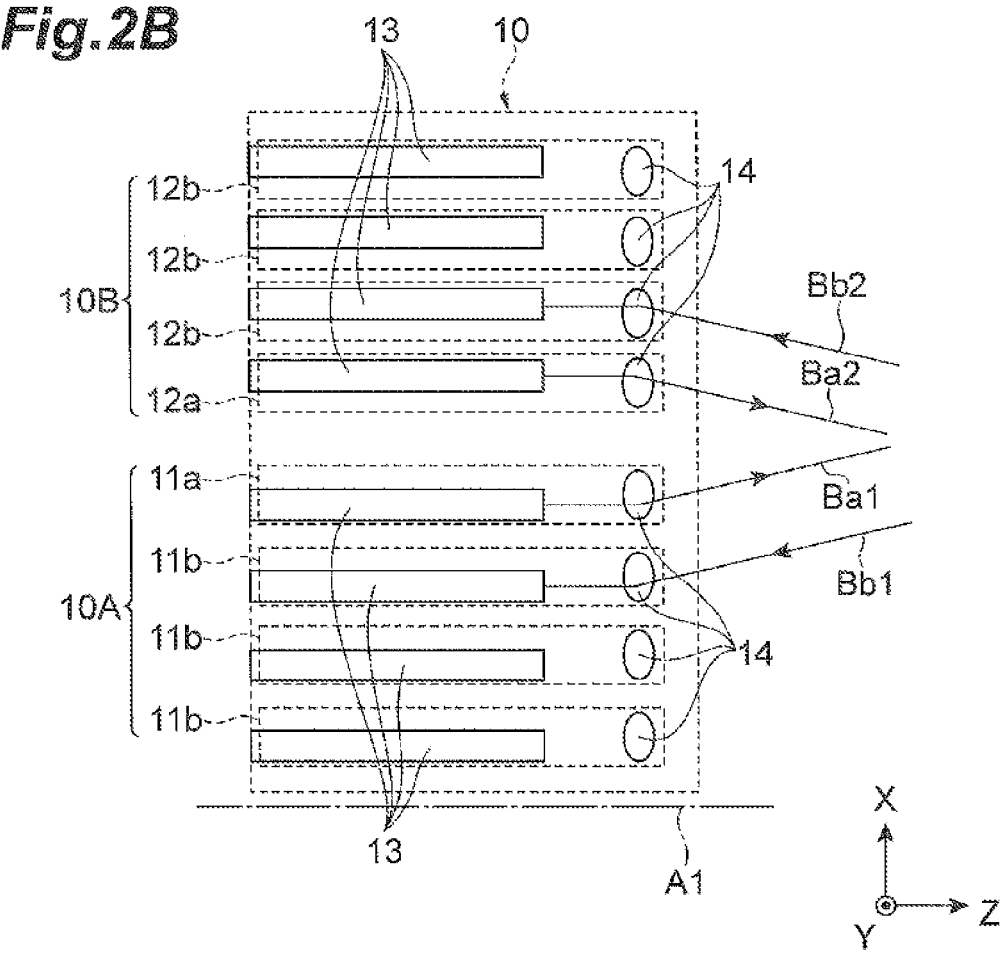
FIG. 2B is an enlarged view of a configuration of the input/output unit and a diagram illustrating the input/output unit when viewed from a lateral side (Y-axis direction)

The input/output unit 10 inputs signal light (hereinafter, referred to as an input beam) to be wavelength multiplexing light including a plurality of wavelength components from the outside of the wavelength selective switch 1A and outputs each wavelength component to the outside of the wavelength selective switch 1A. FIGS. 2A and 2B are enlarged views of a configuration of the input/output unit 10 according to this embodiment. FIG. 2A is a diagram illustrating the input/output unit 10 when viewed from an upper side (X direction) and FIG. 2B is a diagram illustrating the input/output unit 10 when viewed from a lateral side (V direction).

The input/output unit 10 according to this embodiment has a first port group 10A and a second port group 10B. The first port group 10A includes a first input port 11a and a plurality of first output ports 11b. In addition, the second port group 10B includes a second input port 12a and a plurality of second output ports 12b.

A first input beam Ba1 is input from the input port 11a. The input beam Ba1 is wavelength multiplexing light including a plurality of wavelength components and is polarization multiplexing light including a first polarization component (for example, a p-polarization component) and a second polarization component (for example, an s-polarization component) of which polarization planes are different from each other. The input beam Ba1 input from the input port 11a is dispersed in a plurality of wavelength components Bb1 (in the drawings, one wavelength component Bb1 is representatively illustrated) by the wavelength dispersion element 20 (refer to FIGS. 1A and 1B) and each wavelength component is output from the predetermined output port 11b.

A second input beam Ba2 is input from the input port 12a, The input beam Ba2 is wavelength multiplexing light including a plurality of wavelength components and is polarization multiplexing light including a first polarization component (for example, a p-polarization component) and a second polarization component (for example, an s-polarization component) of which polarization planes are different from each other. The input beam Ba2 input from the input port 12a is dispersed in a plurality of wavelength components Bb2 (in the drawings, one wavelength component Bb2 is representatively illustrated) by the wavelength dispersion element 20 (refer to FIGS. 1A and 1B) and each wavelength component is output from the predetermined output port 12b.

As such, in the wavelength selective switch 1A, each wavelength component is switched independently for each of the port groups 10A and 10B. The input port 11a and the plurality of output ports 11b and the input port 12a and the plurality of output ports 12b are included in a surface (XZ plane) including the predetermined axis A1 and are arranged in a line along the X axis (vertical direction) to be a direction crossing the predetermined axis A1.

The input ports 11a and 12a and the output ports 11b and 12b include an optical waveguide 13 that extends along the predetermined axis A1 and a lens 14 that is optically coupled to an apical surface of the optical waveguide 13. In the input port 11a, the first input beam Ba1 input from the optical waveguide 13 is collimated (parallelized) by the lens 14. In addition, in the input port 12a, the second input beam Ba2 input from the optical waveguide 13 is collimated (parallelized) by the lens 14. At this time, because an optical axis of the lens 14 is offset in the X direction for the optical axis of the optical waveguide 13, optical axes of the input beams Ba1 and Ba2 emitted from the lens 14 are inclined to the predetermined axis A1 in the XZ plane.

In this embodiment, a shift direction of the lens 14 is different in the input port 11a and the input port 12a. In the input port 11a, the optical axis of the lens 14 is offset in a positive direction of the X axis for the optical axis of the optical waveguide 13. In contrast, in the input port 12a, the optical axis of the lens 14 is offset in a negative direction of the X axis for the optical axis of the optical waveguide 13. Therefore, the input beam Ba1 and the input beam Ba2 are inclined in a direction to approach each other.

In the output ports, a shift direction of the lens 14 is different in the output port 11b and the output port 12b. In the output port 11b, the optical axis of the lens 14 is offset in a positive direction of the X axis for the optical axis of the optical waveguide 13. In contrast, in the output port 12b, the optical axis of the lens 14 is offset in a negative direction of the X axis for to the optical axis of the optical waveguide 13. Therefore, the wavelength component Bb1 and the wavelength component Bb2 are inclined in a direction to approach each other. When the predetermined axis A1 is set to 0°, inclination angles of the input beams Ba1 and Ba2 and inclination angles of the wavelength components Bb1 and Bb2 are larger than 0° and are smaller than 5°, preferably, are larger than 0° and are smaller than 3°.

Figure 3:
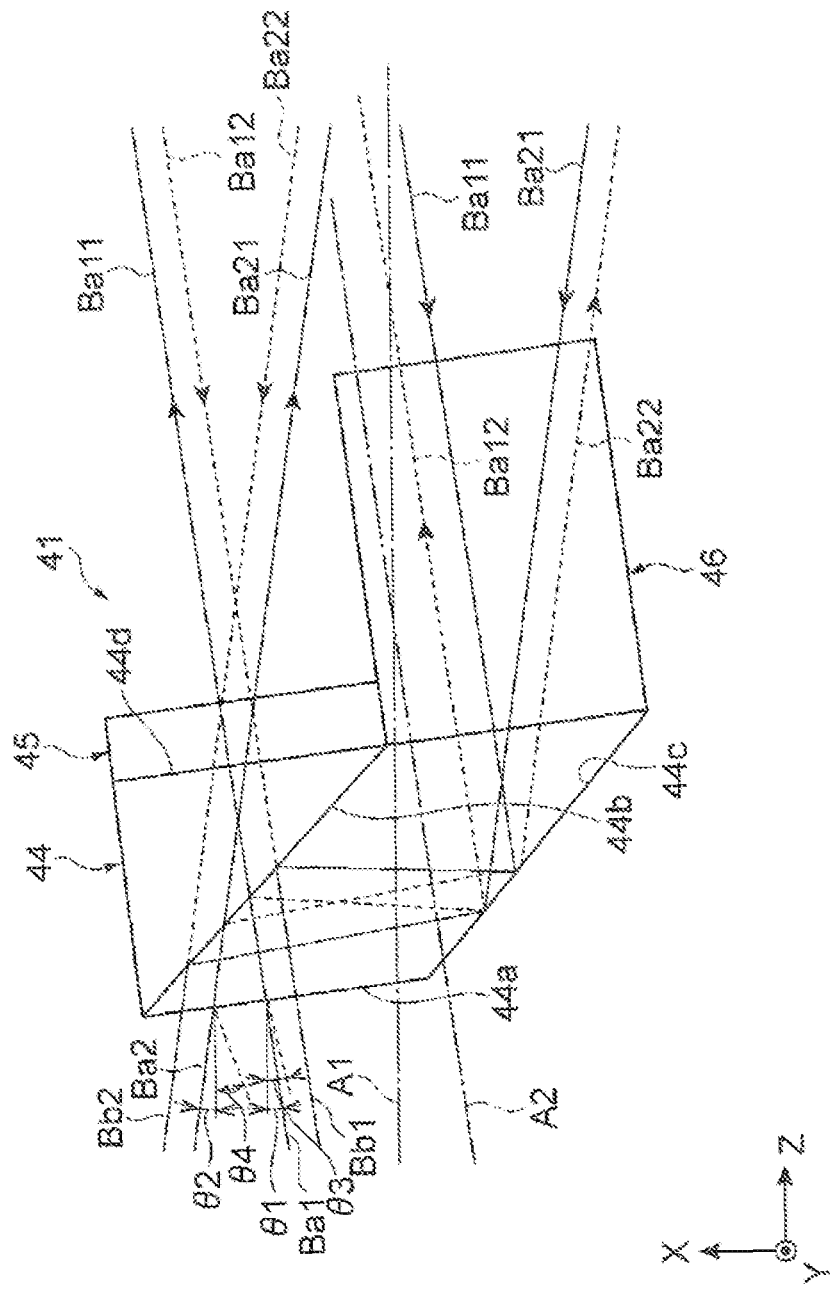
FIG. 3 is an enlarged view of an optical component and a diagram illustrating the optical component when viewed from a lateral side.

As illustrated in FIGS. 1A and 1B, the optical component 41 is arranged on a rear step of the input/output unit 10 on the predetermined axis A1. FIG. 3 is an enlarged view of the optical component 41 according to this embodiment and a diagram illustrating the optical component 41 when viewed from a lateral side (Y direction). The optical component 41 is obtained by integrally forming a polarization separation element 44, a wavelength plate 45, and an air conversion length compensation unit 46.

The polarization separation element 44 is an optical element that has a front surface 44a to be an incidence surface and a polarization separation surface 44b to separate the first polarization component and the second polarization component. The input beams Ba1 and Ba2 are incident from the front surface 44a. The polarization separation surface 44b is inclined to the predetermined axis A1 in the XZ plane, reflects one of the first and second polarization components in the negative direction of the X axis, and transmits the other. By the polarization separation surface 44b, the input beam Ba1 is separated into a first polarization component Ba11 and a second polarization component Ba12 and the input beam Ba2 is separated into a first polarization component Ba21 and a second polarization component Ba22. In the drawings, an example of the case in which the polarization separation surface 44b transmits the first polarization components Ba11 and Ba21 and reflects the second polarization components Ba12 and Ba22 is illustrated.

The polarization separation element 44 further has a reflection surface 44c. The reflection surface 44c is parallel to the polarization separation surface 44b and reflects the second polarization components Ba12 and Ba22 reflected on the polarization separation surface 44b again. Thereby, optical axes of the second polarization components Ba12 and Ba22 are parallel to optical axes of the original input beams Ba1 and Ba2.

The wavelength plate 45 is arranged on the optical axes of the first polarization, components Ba11 and Ba21 and is formed integrally with the polarization separation element 44. Specifically, the wavelength plate 45 is adhered to a rear surface 44d of the polarization separation element 44. The rear surface 44d is parallel to the front surface 44a. Therefore, a plate surface of the wavelength plate 45 is parallel to the front surface 44a. The wavelength plate 45 rotates polarization planes of the first polarization components Ba11 and Ba21 and matches the polarization planes with polarization planes of the second polarization components Ba12 and Ba22. The polarization planes are matched with each other, so that polarization planes of light incident on the deflection element 30 or the wavelength dispersion element 20 to be an element having polarization dependency can be aligned. The wavelength dispersion element 20 having the polarization dependency is a diffraction grating, for example. The deflection element 30 having the polarization dependency is a liquid crystal element, for example. The deflection element 30 is liquid crystal on silicon (LCOS) to be a spatial light modulator (SLM) using the liquid crystal element.

The air conversion length compensation unit 46 is arranged on the optical paths of the second polarization components Ba12 and Ba22, contacts the rear surface 44*d* of the polarization separation element 44, and is formed integrally with the polarization separation element 44. The air conversion length compensation unit 46 is a compensation optical element in this embodiment and compensates for an air conversion length difference in a medium which the first polarization components Ba11 and Ba21 and the second polarization components Ba12 and Ba22 transmit. The air conversion length is represented as d/n, when a thickness of the light transmitting medium is set to d and a refractive index thereof is set to n. A cross-sectional shape of the air conversion length compensation unit 46 along the XZ plane is a shape of a rectangle long in optical axis directions of the polarization components Ba12 and Ba22 and the air conversion length compensation unit 46 is adhered to the rear surface 44*d* of the polarization separation element 44 at a predetermined short side.

The input beams Ba1 and Ba2 from the input/output unit 10 are incident on the front surface 44*a* of the polarization separation element 44. The input beam Ba1 is inclined at a first angle θ1 to the predetermined axis A1 in a surface (XZ plane) including the predetermined axis A1. If an angle is defined in a counterclockwise direction on the basis of the predetermined axis A1, a sign of the first angle θ1 is positive. The input beam Ba2 is inclined at a second angle θ2 to the predetermined axis A1 and is incident on the front surface 44*a* of the polarization separation element 44. A sign of the second angle θ2 is negative. As such, the positive/negative signs of the first angle θ1 and the second angle θ2 for the predetermined axis A1 are opposite to each other. Thereby, the input beams Ba1 and Ba2 are inclined in a direction in which the optical axes approach each other and are incident on the front surface 44*a*. In this embodiment, an absolute value of the first angle θ1 and an absolute value of the second angle θ2 are substantially equal to each other, for example, θ1=α (α is a positive real number) and θ2=−α. For example, α is larger than 0° and is smaller than 5°, preferably, is larger than 0° and is smaller than 3°.

In this embodiment, because the input beams Ba1 and Ba2 from the input/output unit 10 are incident on the front surface 44*a* directly, the angles θ1 and θ2 are equal to inclination angles of the input beams Ba1 and Ba2 emitted from the input/output unit 10 for the predetermined axis A1. However, when a different optical element is provided between the input/output unit 10 and the front surface 44*a*, the inclination angles of the input beams Ba1 and Ba2 emitted from the input/output unit 10 for the predetermined axis A1 and the angles θ1 and θ2 may be different from each other.

In the XZ plane, the optical axis A2 of the optical component 41 is inclined to the predetermined axis A1. Specifically, each normal of the front surface 44*a*, the rear surface 44*d*, a front plate surface and a rear plate surface of the wavelength plate 45, and a front end face and a rear end face of the air conversion length compensation unit 46 is inclined in the X direction for the predetermined axis A1 in the XZ plane. Thereby, parts of the input beams Ba1 and Ba2 incident on the front surface 44*a* are inclined at a third angle θ3 and a fourth angle θ4 to the predetermined axis A1 in the XZ plane, respectively, and are reflected. In addition, in the front plate surface of the wavelength plate 45, parts of the first polarization components Ba11 and Ba21 are inclined at the third angle θ3 and the fourth angle θ4 to the predetermined axis A1 in the XZ plane, respectively, and are reflected. This is the same in the other surfaces (the rear surface 44*d*, the rear plate surface of the wavelength plate 45, and the front end face and the rear end face of the air conversion length compensation unit 46). Here, an inclination angle of the optical component 41 for the predetermined axis A1 is adjusted, so that the angles θ3 and θ4 are different from the angles θ1 and θ2. In addition, the positive/negative signs of the angles θ3 and θ4 for the predetermined axis A1 are equal to each other. In this embodiment, because the optical axis A2 of the optical component 41 is inclined to the predetermined axis A1 in a positive angular direction (counterclockwise direction), the signs of the angles θ3 and θ4 become positive. An absolute value of the angles θ3 and θ4 is larger than an absolute value |α| of an angle (in this embodiment, the angle θ1) having the same sign as the signs of the angles θ3 and θ4 from between the angles θ1 and θ2.

Referring to FIGS. 1A and 1B again, the relay optical system 42 is arranged on the predetermined axis A1 between the optical component 41 and the wavelength dispersion element 20 and optically connects the lens 14 of the input/output unit 10 and the condensing lens 43. The relay optical system 42 includes lenses 42*a* and 42*b*. The lens 42*a* has optical power in the XZ plane and the YZ plane. The lens 42*a* is a rotationally symmetric lens, for example, a spherical lens of a convex shape. The lens 42*a* is arranged on a front step more than the lens 42*b*. The lens 42*b* has optical power in at least the XZ plane. The lens 42*b* is a cylindrical lens having optical power in only the XZ plane, for example. As the relay optical system 42, a reflection-type element having the optical power such as a mirror can be applied, in addition to the transmission-type element such as the lens. Here, the optical power is defined as a reciprocal number of a focal distance.

The wavelength dispersion element 20 is an element to disperse the wavelength multiplexing light in wavelength components and is arranged on the predetermined axis A1 between the relay optical system 42 and the condensing lens 43. The polarization components Ba11, Ba12, Ba21, and Ba22 that have been separated by the optical component 41 and have passed through the relay optical system 42 are incident on the wavelength dispersion element 20. The wavelength dispersion element 20 disperses the wavelength components included in the incident polarization components Ba11, Ba12, Ba21, and Ba22 in the Y direction (that is, the YZ plane) according to the wavelengths thereof and emits the wavelength components. The polarization components Ba11, Ba12, Ba21, and Ba22 are dispersed in a plurality of wavelength components in the wavelength dispersion element 20. Here, only a single wavelength component is illustrated. The wavelength dispersion element 20 is a diffraction grating, for example.

The condensing lens 43 has optical power in the XZ plane and the YZ plane. The condensing lens 43 emits the wavelength components included in the polarization components Ba11, Ba12, Ba21, and Ba22 dispersed by the wavelength dispersion element 20 to the deflection element 30 while collimating the wavelength components in the XZ plane. The condensing lens 43 emits the wavelength components included in the polarization components Ba11, Ba12, Ba21, and Ba22 dispersed by the wavelength dispersion element 20 to the deflection element 30 while condensing the wavelength components in the YZ plane. The condensing lens 43 is a rotationally symmetric lens and is a spherical lens of a convex shape having optical power in the XZ plane and the YZ plane.

The deflection element 30 deflects a direction of the incident beam. The deflection element 30 is arranged at a beam waist position of the wavelength component included in the polarization components Ba11, Ba12, Ba21, and Ba22 emitted from the condensing lens 43, in the YZ plane. Therefore, in the XZ plane and the YZ plane, an arrangement position of the deflection element 30 may not be matched with a rear focal point of the condensing lens 43. The deflection element 30 deflects the wavelength components included in the polarization components Ba11, Ba12, Ba21, and Ba22 condensed by the condensing lens 43 to the predetermined output ports 11b and 12b.

The deflection element 30 has a plurality of deflection elements arranged along the Y-axis direction and deflects each wavelength component independently by phase modulation. As the deflection element 30, the SLM can be used and the LCOS is preferably used. In this case, a plurality of pixels arranged in the X direction among a plurality of pixels arranged in a two-dimensional array along the X axis and the Y axis perform phase modulation of each wavelength component.

The wavelength components deflected by the deflection element 30 are incident on the optical component 41 again through the condensing lens 43, the wavelength dispersion element 20, and the relay optical system 42, as the polarization components Ba11, Ba12, Ba21, and Ba22. The polarization components Ba11 and Ba12 are multiplexed with each other in the polarization separation surface 44b of the optical component 41 and are output as the wavelength component Bb1 (refer to FIGS. 2A and 2B) to the outside of the wavelength selective switch 1A through the predetermined output port 11b. In addition, the polarization components Ba21 and Ba22 are multiplexed with each other in the polarization separation surface 44b of the optical component 41 and are output as the wavelength component Bb2 (refer to FIGS. 2A and 2B) to the outside of the wavelength selective switch 1A through the predetermined output port 12b.

An effect obtained by the wavelength selective switch 1A having the configuration described above will be described. The optical system 40 of the wavelength selective switch 1A has the optical component 41. In the optical component 41, the input beam Ba1 input from the input port 11a is inclined at the angle $\theta 1$ to the predetermined axis A1 in the surface (XZ plane) including the predetermined axis A1 and is incident and the input beam Ba2 input from the input port 12a is inclined, at the angle $\theta 2$ to the predetermined axis A1 in the XZ plane and is incident. In addition, the positive/negative signs of the inclination angles of the angle $\theta 1$ and the angle $\theta 2$ for the predetermined axis A1 are opposite to each other. Therefore, when optical component 41 has a refractive index boundary surface vertical to the predetermined axis A1, the input beam input from one input port is reflected on the refractive index boundary surface and returns to other input port. Meanwhile, in the wavelength selective switch 1A according to this embodiment, the optical axis of the optical component 41 is inclined to the predetermined axis A1 and each reflection light of the input beams Ba1 and Ba2 incident on the optical component 41 is reflected at the angles $\theta 3$ and $\theta 4$ for the predetermined axis A1 in the XZ plane. In addition, the angles $\theta 3$ and $\theta 4$ are different from the angles $\theta 1$ and $\theta 2$. The positive/negative signs of the inclination angles of the angles $\theta 3$ and $\theta 4$ for the predetermined axis A1 are equal to each other. Thereby, the reflection light of the input beam Ba1 incident on the optical component 41 can be prevented from returning to the input port 12a and the reflection light of the input beam Ba2 incident on the optical component 41 can be prevented from returning to the input port 11a. That is, according to the wavelength selective switch 1A according to this embodiment, the input beam input from the input port of the certain port group can be prevented from returning to the input port of the different port group.

In addition, as in this embodiment, the absolute value of the angles $\theta 3$ and $\theta 4$ may be larger than the absolute value of the angle having the same sign as the signs of the angles $\theta 3$ and $\theta 4$ from between the angles $\theta 1$ and $\theta 2$. Thereby, because the optical axis of each reflection light of the input beams Ba1 and Ba2 can be shifted to the outside of the optical axes of the input beams Ba1 and Ba2, the reflection light of the input beams Ba1 and Ba2 incident on the optical component 41 can be effectively avoided from returning to the input ports 12a and 11a. Preferably, the optical axes of the reflection light of the input beams Ba1 and Ba2 incident on the optical component 41 are inclined to be shifted from the input ports 11a and 12a and all of the output ports 11b and 12b included in the port groups 10A and 10B.

In addition, as in this embodiment, the optical component 41 may have the front surface 44a (incidence surface), the input beams Ba1 and Ba2 may be inclined at the angles $\theta 1$ and $\theta 2$ to the predetermined axis A1, respectively, and may be incident on the front surface 44a, the normal of the front surface 44a may be inclined to the predetermined axis A1, and the reflection light of the input beams Ba1 and Ba2 may be reflection light in the front surface 44a. The front surface 44a of the optical component 41 may be one of the refractive index boundary surfaces (for example, the front surface 44a and the front plate surface of the wavelength plate 45). Therefore, the configuration described above is included, so that the reflection light of the input beams Ba1 and Ba2 incident on the front surface 44a can be prevented from returning to the input ports 12a and 11a.

In addition, as in this embodiment, when the input beam Ba1 includes the polarization components Ba11 and Ba12 of which the polarization planes are different from each other and the input beam Ba2 includes the polarization components Ba21 and Ba22 of which the polarization planes are different from each other, the optical component 41 may have the polarization separation surface 44b to separate the polarization components. According to the wavelength selective switch 1A according to this embodiment, even when the optical component 41 is included, the input beam input from the input port of the certain port group can be surely prevented from returning to the input port of the different port group.

In addition, as in this embodiment, the optical component 41 may be obtained by integrally forming the wavelength plate 45 and the polarization separation element 44 having the polarization separation surface 44b. Thereby, the wavelength selective switch 1A can be miniaturized. In addition, the angles of the polarization separation element 44 and the wavelength plate 45 can be collectively adjusted and the reflection light of the input beams incident on the wavelength plate 45 can be easily prevented from returning to the input ports 11a and 12a.

In addition, as in this embodiment, the optical component 41 may have the air conversion length compensation unit 46 on the optical path of one polarization component separated by the polarization separation surface 44b and may be obtained by integrally forming the polarization separation element 44 and the air conversion length compensation unit 46. Thereby, the wavelength selective switch 1A can be miniaturized. In addition, the angles of the polarization separation element 44 and the air conversion length compensation unit 46 can be collectively adjusted and the reflection light of the input beams incident on the air conversion length compensation unit 46 can be easily prevented from returning to the input ports 11a and 12a.

In addition, as in this embodiment, the absolute value of the angle θ1 and the absolute value of the angle θ2 may be substantially equal to each other. In this case, if the optical component 41 has the refractive index boundary surface vertical to the predetermined axis A1, a part of the input beams input from one input port is reflected on the refractive index boundary surface and easily returns to other input port. According to this embodiment, the optical axis of the optical component 41 is inclined to the predetermined axis A1, so that the reflection light of the input beam input from one input port can be effectively prevented from returning to other input port, even when the optical component 41 has the refractive index boundary surface.

(Modification)

Figure 4:
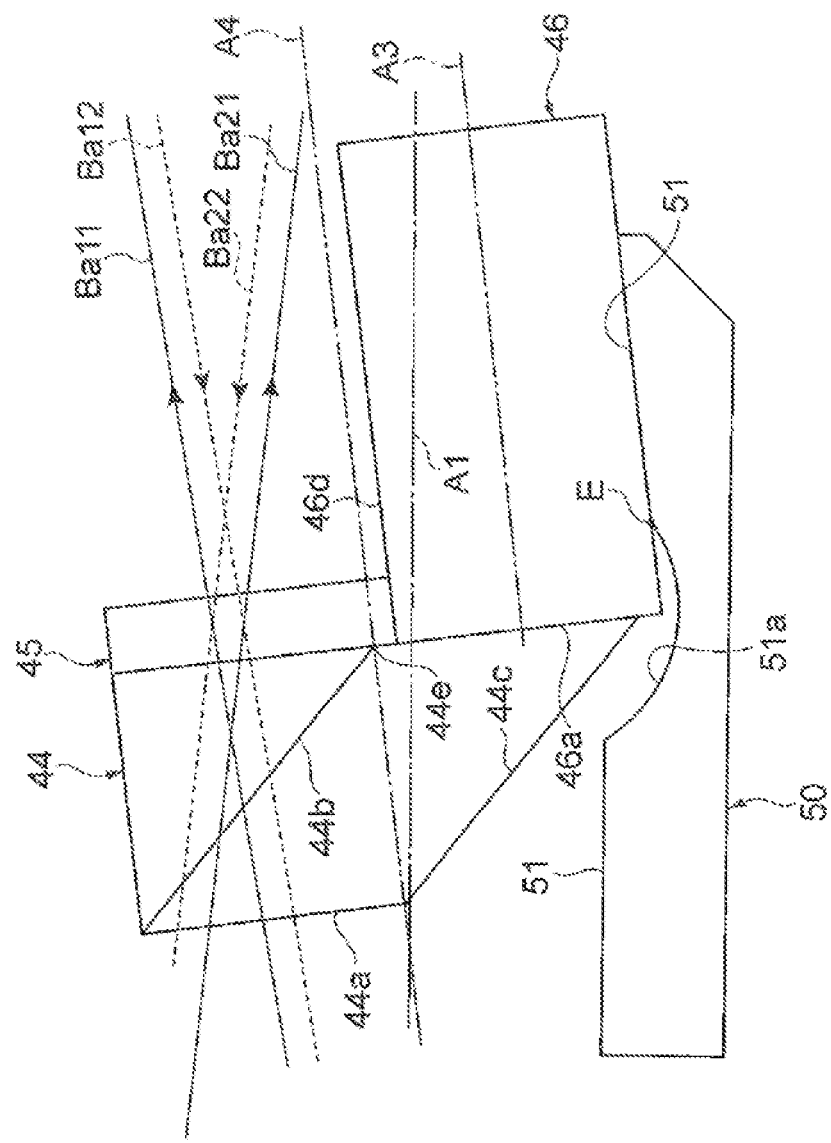
FIG. 4 is a lateral cross-sectional view illustrating a configuration according to a modification.

FIG. 4 is a lateral cross-sectional view illustrating a configuration according to a modification of the embodiment, in a wavelength selective switch according to this modification, a center axis A3 of the air conversion length compensation unit 46 parallel to the optical axis A2 of the optical component 41 is shifted in a direction separated from optical axes of the polarization components Ba11 and Ba21 toward the deflection element 30, as compared with the embodiment. In other words, a top surface 46d of the air conversion length compensation unit 46 facing the polarization components Ba11 and Ba21 is positioned on the lower side of an axis A4 passing through an upper end 44e of the rear surface 44d and parallel to the optical axis A2 (refer to FIG. 3) (in the direction separated from the optical axes of the polarization components Ba11 and Ba21 toward the deflection element 30).

As described above, a cross-sectional shape of the air conversion length compensation unit 46 along the XZ plane is a shape of a rectangle long in a direction along the optical axis A2. Therefore, the optical axis A2 of the optical component 41 is inclined to the predetermined axis A1, so that optical paths of the polarization components Ba11 and Ba21 toward the deflection element 30 and optical paths of the polarization components Ba12 and Ba22 deflected by the deflection element 30 may be disturbed by the air conversion length compensation unit 46. According to this modification, the center axis A3 of the air conversion length compensation unit 46 is shifted as described above, so that that the optical paths of the polarization components Ba11 and Ba21 toward the deflection element 30 and the optical paths of the polarization components Ba12 and Ba22 deflected by the deflection element 30 can be avoided from being shifted from the air conversion length compensation unit 46.

The wavelength selective switch 1B according to the modification further includes a support member 50. The support member 50 has a support surface 51 and the optical component 41 is supported in the support surface 51. The optical component 41 is placed on the support surface 51 of the support member 50 and contacts the support surface 51. A concave portion 51a is formed in the support surface 51 and the concave portion 51a overlaps a front surface 46a of the air conversion length compensation unit 46 when viewed from a direction (X direction) crossing the predetermined axis A1. In addition, a contact position E of the air conversion length compensation unit 46 and the support surface 51 is a rear edge of the concave portion 51a in a direction (Z direction) along the predetermined axis A1. According to such a configuration, when an angle of the optical component 41 is adjusted, a front corner of the air conversion length compensation unit 46 can be released to the concave portion 51a. Therefore, the front surface 44a can be prevented from being vertically moved by angle adjustment.

The wavelength selective switch according to the present invention is not limited to the embodiment and various changes can be made. For example, in the embodiment and the modification, the front surface of the optical component having the polarization separation function and the plate surface of the wavelength plate are exemplified as the refractive index boundary surface on which the parts of the first and second input beams are reflected. However, the parts of the first and second input beams in the wavelength selective switch according to the present invention may be light reflected on other surface of the optical component or a surface of an optical component other than the optical component included in the optical system. Therefore, in the present invention, the optical component having the polarization separation function is not an essential element.

In addition, in the embodiment and the modification, the arrangement direction of the ports in the input/output unit is the X direction and the dispersion direction in the wavelength dispersion element is the Y direction. However, the arrangement direction and the dispersion direction may be the same direction.

What is claimed is:

1. A wavelength selective switch comprising:
an input/output unit having a first port group including a first input port and a first output port and a second port group including a second input port and a second output port;
a wavelength dispersion element dispersing wavelength multiplexing light in wavelength components;
a deflection element deflecting a direction of an incident beam; and
an optical system optically coupling the input/output unit, the wavelength dispersion element, and the deflection element along a predetermined axis,
wherein the optical system includes an optical component,
a first input beam input from the first input port is inclined at a first angle to the predetermined axis and is incident on the optical component,
a second input beam input from the second input port is inclined at a second angle to the predetermined axis and is incident on the optical component,
positive/negative signs of inclinations of the first angle and the second angle for the predetermined axis are different from each other,
an optical axis of the optical component is inclined to the predetermined axis, such that a part of the first input beam is inclined at a third angle to the predetermined axis in the optical component and is reflected and a part of the second input beam is inclined at a fourth angle to the predetermined axis in the optical component and is reflected,
the third angle is different from the first angle and the second angle,
the fourth angle is different from the first angle and the second angle, and
positive/negative signs of inclinations of the third angle and the fourth angle for the predetermined axis are equal to each other, wherein the first and second input beams include first and second polarization components of which polarization surfaces are different from each other, respectively, and the optical component has a polarization separation surface to separate the first and second polarization components, and wherein the optical component is obtained by integrally forming an optical element having the polarization separation surface and a wavelength plate to match the polarization surfaces of the first and second polarization components separated by the polarization separation with each other.

2. The wavelength selective switch according to claim 1, wherein an absolute value of the third angle and the fourth angle is larger than an absolute value of the angle having the same sign as the positive/negative signs of the inclinations of the third angle and the fourth angle for the predetermined axis, from between the first angle and the second angle.

3. The wavelength selective switch according to claim 1, wherein the optical component has an incidence surface on which the first input beam and the second input beam are incident, a normal of the incidence surface is inclined to the predetermined axis, and parts of the first and second input beams are reflected on the incidence surface.

4. The wavelength selective switch according to claim 1, wherein the first and second input ports and the first and second output ports are arranged along a surface crossing the predetermined axis.

5. The wavelength selective switch according to claim 1, wherein an absolute value of the first angle and an absolute value of the second angle are substantially equal to each other.

6. A wavelength selective switch comprising:

an input/output unit having a first port group including a first input port and a first output port and a second port group including a second input port and a second output port;

a wavelength dispersion element dispersing wavelength multiplexing light in wavelength components;

a deflection element deflecting a direction of an incident beam; and an optical system optically coupling the input/output unit, the wavelength dispersion element, and the deflection element along a predetermined axis, wherein the optical system includes an optical component, a first input beam input from the first input port is inclined at a first angle to the predetermined axis and is incident on the optical component, a second input beam input from the second input port is inclined at a second angle to the predetermined axis and is incident on the optical component, positive/negative signs of inclinations of the first angle and the second angle for the predetermined axis are different from each other, an optical axis of the optical component is inclined to the predetermined axis, such that a part of the first input beam is inclined at a third angle to the predetermined axis in the optical component and is reflected and a part of the second input beam is inclined at a fourth angle to the predetermined axis in the optical component and is reflected, the third angle is different from the first angle and the second angle, the fourth angle is different from the first angle and the second angle, and positive/negative signs of inclinations of the third angle and the fourth angle for the predetermined axis are equal to each other, wherein the first and second input beams include first and second polarization components of which polarization surfaces are different from each other, respectively, and the optical component has a polarization separation surface to separate the first and second polarization components, wherein the optical component is obtained by integrally forming an optical element having the polarization separation surface and a compensation optical element provided on an optical path of one polarization component separated by the polarization separation surface and compensating for air conversion lengths of the first and second polarization components, and a center axis of the compensation optical element is parallel to the optical axis of the optical component and is shifted in a direction separated from an optical axis of the other polarization component separated by the polarization separation surface.

7. The wavelength selective switch according to claim 6, wherein an absolute value of the third angle and the fourth angle is larger than an absolute value of the angle having the same sign as the positive/negative signs of the inclinations of the third angle and the fourth angle for the predetermined axis, from between the first angle and the second angle.

8. The wavelength selective switch according to claim 6, wherein the optical component has an incidence surface on which the first input beam and the second input beam are incident, a normal of the incidence surface is inclined to the predetermined axis, and parts of the first and second input beams are reflected on the incidence surface.

9. The wavelength selective switch according to claim 6, further comprising:

a member having a support surface supporting the optical component, wherein a concave portion is formed in the support surface, and the compensation optical element and the member contact in the concave portion in a direction along the predetermined axis.

10. The wavelength selective switch according to claim 6, wherein the first and second input ports and the first and second output ports are arranged along a surface crossing the predetermined axis.

11. The wavelength selective switch according to claim 6, wherein an absolute value of the first angle and an absolute value of the second angle are substantially equal to each other.

* * * * *